United States Patent
Sasaki

(10) Patent No.: US 9,580,142 B2
(45) Date of Patent: Feb. 28, 2017

(54) COOLING STRUCTURE FOR SADDLE-TYPE VEHICLE

(71) Applicant: HONDA MOTOR CO., LTD., Tokyo (JP)

(72) Inventor: Takashi Sasaki, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/832,216

(22) Filed: Aug. 21, 2015

(65) Prior Publication Data

US 2016/0090152 A1 Mar. 31, 2016

(30) Foreign Application Priority Data

Sep. 30, 2014 (JP) .................... 2014-201474

(51) Int. Cl.
| | |
|---|---|
| *B62M 7/04* | (2006.01) |
| *B62J 35/00* | (2006.01) |
| *B62K 11/04* | (2006.01) |
| *B62K 19/48* | (2006.01) |

(52) U.S. Cl.
CPC ............... *B62M 7/04* (2013.01); *B62J 35/00* (2013.01); *B62K 11/04* (2013.01); *B62K 19/48* (2013.01)

(58) Field of Classification Search
CPC  B62M 7/04; B62J 35/00; B62K 11/04; B62K 19/48
USPC ........................................................ 180/229
See application file for complete search history.

(56) References Cited

U.S. PATENT DOCUMENTS

| | | | | |
|---|---|---|---|---|
| 4,347,909 A | * | 9/1982 | Takemura ................ | B62J 35/00 180/219 |
| 4,633,965 A | * | 1/1987 | Tsurumi .................. | F02B 61/02 165/41 |
| 4,685,530 A | * | 8/1987 | Hara ........................ | B62J 17/00 123/41.27 |
| 5,016,725 A | * | 5/1991 | Muramatsu ............ | B62K 11/04 180/225 |
| 5,566,746 A | * | 10/1996 | Reise ..................... | B60K 11/04 165/41 |
| 6,360,839 B1 | * | 3/2002 | Urano .................... | B62K 11/04 180/229 |

(Continued)

FOREIGN PATENT DOCUMENTS

JP          8-253185 A      10/1996

*Primary Examiner* — Jacob Knutson
(74) *Attorney, Agent, or Firm* — Westerman, Hattori, Daniels & Adrian, LLP

(57) ABSTRACT

A cooling structure for a saddle-type vehicle includes a main frame; an engine; an exhaust pipe extending rearward from a front portion of the engine; fuel tanks disposed laterally of the engine; and a skid plate covering front portions of the engine and the exhaust pipe. The skid plate includes openings defined in a central upper portion thereof for introducing ram air from a front of the vehicle toward the engine. The openings are covered with a mesh member. The skid plate has first bulging portions bulging forwardly on both sides of the openings. The fuel tanks include bulging tank portions disposed rearward of and along the first bulging portions and covering front portions of the engine. Ram air guided toward a central area in a vehicle widthwise direction by the first bulging portions passes through the mesh member and the openings to cool the exhaust pipe and the engine.

14 Claims, 14 Drawing Sheets

(56) References Cited

U.S. PATENT DOCUMENTS

| | | | |
|---|---|---|---|
| 2009/0108630 A1* | 4/2009 | Nakao | B62K 11/04 296/192 |
| 2013/0306391 A1* | 11/2013 | Kontani | B62K 11/00 180/219 |
| 2015/0014079 A1* | 1/2015 | Takasaki | B62K 11/04 180/229 |
| 2015/0083512 A1* | 3/2015 | Maeda | B62J 17/00 180/229 |

* cited by examiner

COOLING STRUCTURE FOR SADDLE-TYPE VEHICLE

FIELD OF THE INVENTION

The present invention relates to a cooling structure for use on a saddle-type vehicle having a skid plate in front of an engine.

BACKGROUND OF THE INVENTION

There has been known a structure in which a fuel tank is disposed astride of a main tube and extends downwardly to a large extent in covering relation to the sides of an engine, and a skid plate has a plurality of openings defined in left and right side surfaces thereof (see, for example, Japanese Patent Laid-Open No. 8-253185).

SUMMARY OF THE INVENTION

It has been desirable that motorcycles designed for traveling over a long distance have a fuel tank of increased capacity. For example, a motorcycle may be constructed such that a fuel tank extends downwardly in surrounding relation to an engine, the engine has an exhaust pipe extending forwardly, and the engine and the exhaust pipe have front areas covered with a skid plate. The motorcycle thus constructed needs to take into account a the influence from such a structure.

One object of the present invention is to provide a cooling structure for use on a saddle-type vehicle which allows fuel tanks to have an increased capacity and Which is capable of effectively cooling an engine, an exhaust pipe, and the fuel tanks.

In order to achieve this objective, there is provided in accordance with the present invention a cooling structure for a saddle-type vehicle including: a main frame (22) extending obliquely rearwardly and downwardly from a head pipe (21); an engine (41) supported on the main frame (22); an exhaust pipe (62) extending rearwardly from a front portion of the engine (41); fuel tanks (66) disposed laterally of the engine (41); and a skid plate (77) covering front portions of the engine (41) and the exhaust pipe (62), the skid plate (77) having openings (77j, 77k) defined in a central upper portion thereof for introducing ram air from a front of the vehicle toward the engine (41), wherein the openings (77j, 77k) are covered with a mesh member (105), the skid plate (77) has first bulging portions (77d, 77e) bulging forwardly on both sides of the openings (77j, 77k), the fuel tanks (66) include bulging tank portions (66j) disposed rearwardly of and along the first bulging portions (77d, 77e) and covering front portions of the engine (41), and ram air guided toward a central area in a vehicle widthwise direction by the first bulging portions (77d, 77e) passes through the mesh member (105) and the openings (77j, 77k) to cool the exhaust pipe (62) and the engine (41).

In the above arrangement, the skid plate (77) may include on a central lower portion thereof a second bulging portion (77f) that bulges forwardly along the exhaust pipe (62), the second bulging portion (77f) being disposed below the mesh member (105).

In the above arrangement, the fuel tanks (66) may include cavities (66h) defined as dented portions of front walls (66f) and inner walls (66n) thereof, the mesh member (105) may overlap at least portions of the cavities (66h) in a vehicle longitudinal direction, and ram air that has passed through the mesh member (105) may be collected to the central area in the vehicle widthwise direction by the cavities (66h).

In the above arrangement, a front fender (33) that covers an upper portion of front wheel (13) may be disposed forwardly of the skid plate (77), and the front fender (33) may be of a shape substantially along an outer profile of the front wheel (13) and has its lower end portion oriented toward the mesh member (105) for guiding rain air toward the mesh member (105).

In the above arrangement, a down frame (26) that extends substantially downwardly from the head pipe (21) may be disposed below the main frame (22), the down frame (26) may have a branched area (26C) where the down frame (26) is branched into left and right portions in a vicinity of an upper edge of the mesh member (105), and the exhaust pipe (62) may extend forwardly from the engine (41) so as to pass between the left and right portions of the down frame (26) below the branched area (26C).

In the above arrangement, radiators (101) may be disposed in the cavities (66h) upwardly of the skid plate (77), each of the radiators (101) may be inclined such that an inner side thereof in the vehicle widthwise direction is positioned rearwardly of an outer side thereof in the vehicle widthwise direction, and rear surfaces (66g) of the cavities (66h) may be spaced rearwardly of the radiators (101) and extend along the inclination of the radiators (101).

According to the present invention, the openings are covered with the mesh member, the skid plate has the first bulging portions bulging forwardly on both sides of the openings, the fuel tanks include the bulging tank portions disposed rearwardly of and along the first bulging portions and covering front portions of the engine, so that rain air guided toward the central area in the vehicle widthwise direction by the first bulging portions passes through the mesh member and the openings to cool the exhaust pipe and the engine. Since the fuel tanks have the bulging tank portions, the capacity of the fuel tanks is increased, and the ram air is collected to the central area in the vehicle widthwise direction by the first bulging portions of the skid plate to effectively cool the exhaust pipe, the engine, and the fuel tanks.

The skid plate includes on the central lower portion thereof the second bulging portion that bulges forwardly along the exhaust pipe, and the second bulging portion is disposed below the mesh member. Therefore, the second bulging portion collects ram air that is applied to the skid plate below the mesh member toward the mesh member disposed thereabove for effectively cooling the exhaust pipe and the engine.

The fuel tanks include the cavities defined as dented portions of the front walls and the inner walls thereof. The mesh member overlaps at least portions of the cavities in the vehicle longitudinal direction. Ram air that has passed through the mesh member is collected to the central area in the vehicle widthwise direction by the cavities. Therefore, the ram air that has passed through the mesh member is prevented from being dispersed, but is collected to the central area in the vehicle widthwise direction for effectively cooling the exhaust pipe and the engine.

The front fender that covers the upper portion of the front wheel is disposed forwardly of the skid plate. The front fender is of a shape substantially along the outer profile of the front wheel and has its lower end portion oriented toward the mesh member for guiding ram air toward the mesh member. Therefore, since ram air flowing along the front fender is guided toward the mesh member, it is possible to collect more ram air to the mesh member for effectively cooling the exhaust pipe and the engine.

The down frame that extends substantially downwardly from the head pipe is disposed below the main frame. The down frame has the branched area where the down frame is branched into the left and right portions in the vicinity of the upper edge of the mesh member. Since the exhaust pipe extends forwardly from the engine so as to pass between the left and right portions of the down frame below the branched area, the exhaust pipe can be located closely to the mesh member by extending forwardly of the down frame. Therefore, ram air that is collected by the skid plate can cool the exhaust pipe immediately after it has passed through the mesh member, so that the exhaust pipe can effectively be cooled by ram air that has not been warmed.

The radiators are disposed in the cavities upwardly of the skid plate, and each of the radiators is inclined such that the inner side thereof in the vehicle widthwise direction is positioned rearwardly of the outer side thereof in the vehicle widthwise direction. Inasmuch as the rear surfaces of the cavities are spaced rearwardly of the radiators and extend along the inclination of the radiators, the rear surfaces can smoothly guide discharged air from the radiators to the central area in the vehicle widthwise direction, so that the exhaust pipe and the engine can be cooled also by the discharged air from the radiators.

BRIEF DESCRIPTION OF THE DRAWINGS

The present invention will be described with reference to the accompanying drawings, wherein.

DETAILED DESCRIPTION OF THE INVENTION

Figure 1:
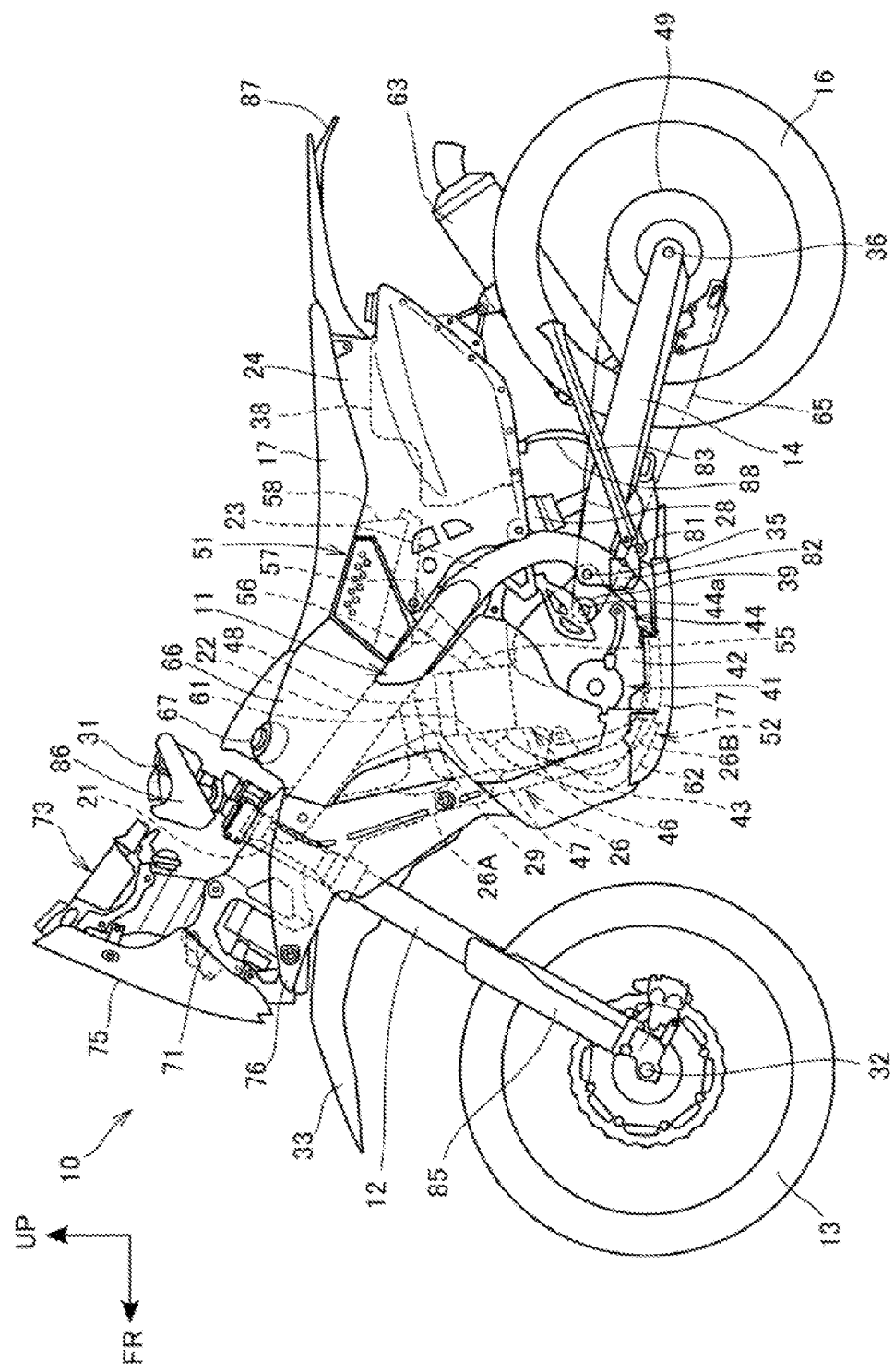
FIG. 1 is a left side elevational view of a motorcycle that is provided with a cooling structure according to an embodiment of the present invention.

An embodiment of the present invention will be described below with reference to the drawings. In the description that follows, directions such as forward, rearward, leftward, rightward, upward, and downward directions are equivalent to those used with respect to a vehicle body unless specifically described. In the drawings, the reference symbol FR represents a forward direction of the vehicle body UP an upward direction of the vehicle body, and LH a leftward direction of the vehicle body.

FIG. 1 is a left side elevational view of a motorcycle 10 that is provided with a cooling structure according to an embodiment of the present invention.

The motorcycle 10 is a saddle-type vehicle designed for rallies in which a front wheel 13 is supported by a front fork 12 on a front end portion of a vehicle frame 11, a rear wheel 16 is supported by a swing arm 14 on a lower portion of the vehicle frame 11, and a seat 17 is supported on a rear portion of the vehicle frame 11.

The vehicle frame 11, which serves as a framework of the motorcycle 10, includes a head pipe 21, a pair of left and right main frames 22, a pair of left and right central frames 23, a rear frame 24, and a down frame 26.

The head pipe 21 serves as a front end portion of the vehicle frame 11, and the front fork 12 is steerably supported on the head pipe 21. The front fork 12 has an upper end portion on which a bar handle 31 is mounted, a lower end portion on which the front wheel 13 is supported by a shaft 32, and a longitudinally intermediate portion on which a front fender 33 is mounted in covering relation to an upper portion of the front wheel 13.

The main frames 22 extend straight obliquely rearwardly and downwardly as viewed in side elevation from the head pipe 21. The central frames 23 are curved substantially arcuately in a rearwardly projecting shape from rear end portions of the main frames 22, and a pivot shaft 35 is supported on the central frames 23 at a position beneath the rearmost curved portions thereof. The swing arm 14 has a front end portion vertically swingably supported on the pivot shaft 35, and the rear wheel 16 is supported on a rear end portion of the swing arm 14 by a shaft 36.

The rear frame 24, which includes a monologue resin frame, is mounted on the pair of left and right main frames 22 and the pair of left and right central frames (pivot frames) 23. A rear fuel tank 38 of resin is mounted on the inner side of a rear portion of the rear frame 24.

The down frame 26 includes an upper down frame portion 26A which serves as an upper section thereof and a pair of left and right lower down frame portions 26B which serve as a lower section thereof.

The upper down frame portion 26A extends substantially downwardly from the head pipe 21 at a shaper angle than the main frames 22. The lower down frame portions 26B extend downwardly as viewed in side elevation from a lower end portion of the upper down frame portion 26A, are branched to the left and right, are curved and extend rearwardly substantially horizontally, and are connected to respective lower end portions of the central frames 23.

A plurality of cross pipes (not shown) that extend in a vehicle widthwise direction lie between the left and right central frames 23. A rear cushion unit 28 extends between an upper one of the cross pipes and the swing arm 14. A reinforcing frame 29 extends between the main frames 22 and the upper down frame portion 26A. A cross pipe (not shown) extends in the vehicle widthwise direction and lies between and interconnects the left and right lower down frame portions 26B.

An engine 41 is supported on the lower down frame portions 26B and the pivot shaft 35. The engine 41 includes a crankcase 42 and a cylinder section 43 extending upwardly from a front upper portion of the crankcase 42. A transmission 44 is mounted on a rear portion of the crankcase 42.

The cylinder section 43 includes a cylinder block 46 mounted on the crankcase 42, a cylinder head 47 mounted on an upper end portion of the cylinder block 46, and a head cover 48 that closes an upper opening in the cylinder head 47.

The cylinder block 46 has a lower portion inserted in the crankcase 42 and has cylinder bores in which pistons (not shown) are vertically movably inserted.

An intake device 51 is connected to a rear surface of the cylinder head 47, whereas an exhaust device 52 is connected to a front surface of the cylinder head 47.

The intake device 51 includes an intake pipe 55 mounted on the cylinder head 47, a throttle body 56 connected to a rear end portion of the intake pipe 55, and an air cleaner 58 connected to a rear end portion of the throttle body 56 by a connecting tube 57. The intake pipe 55, the throttle body 56, and the connecting tube 57 extend substantially in line obliquely rearwardly and upwardly from the cylinder head 47 and are connected to the air cleaner 58.

The exhaust device 52 includes an exhaust manifold 61 mounted on the cylinder head 47, an exhaust pipe 62 connected to a front end portion of the exhaust manifold 61, and a muffler 63 connected to a rear end portion of the exhaust pipe 62. The exhaust pipe 62 extends obliquely downwardly and forwardly from the front end portion of the exhaust manifold 61, is then bent laterally to the right in the vehicle widthwise direction and then rearwardly extends rearwardly in a lower right portion of the vehicle body, and is connected to the muffler 63 on the right side of the swing arm 14.

The transmission 44 has an output shaft 44a on which a drive sprocket 39 is mounted. A chain 65 is trained around the drive sprocket 39 and a driven sprocket 49 that is integrally combined with the rear wheel 16 for transmitting drive power from the transmission 44 to the rear wheel 16.

A pair of left and right front fuel tanks 66 are disposed respectively on both sides of the main frames 22, the down frame 26, and a portion of the engine 41. When the motorcycle 10 partakes in rallies, since the motorcycle 10 runs over a long distance, the pair of left and right front fuel tanks 66 and the rear fuel tank 38 jointly provide a large tank capacity. The reference symbol 67 represents each of caps that close fuel filler openings of the front fuel tanks 66.

A front stay 71 that projects forwardly is fixed to a front portion of the head pipe 21, and supports a head light, rally equipment 73 such as a road book holder, and a wind screen 75, etc.

An upper portion of the front fork 12 and an upper portion of the down frame 26 are covered with a pair of left and right shrouds 76 on both sides thereof. Front and lower portions of the engine 41 and lower front sides of the front fuel tanks 66 are covered with and protected by a skid plate 77.

Steps 82 for use by the rider and a side stand 83 are supported on lower portions of the central frames 23 by step brackets 81.

The reference symbol 85 represents a pair of left and right fork covers that cover a front lower portion of the front fork 12, 86 grip guards that cover front portions of the grips of the bar handle 31, 87 a rear fender that covers an upper portion of the rear wheel 16, and 88 a mud mud disposed forwardly of the rear wheel 16.

Figure 2:
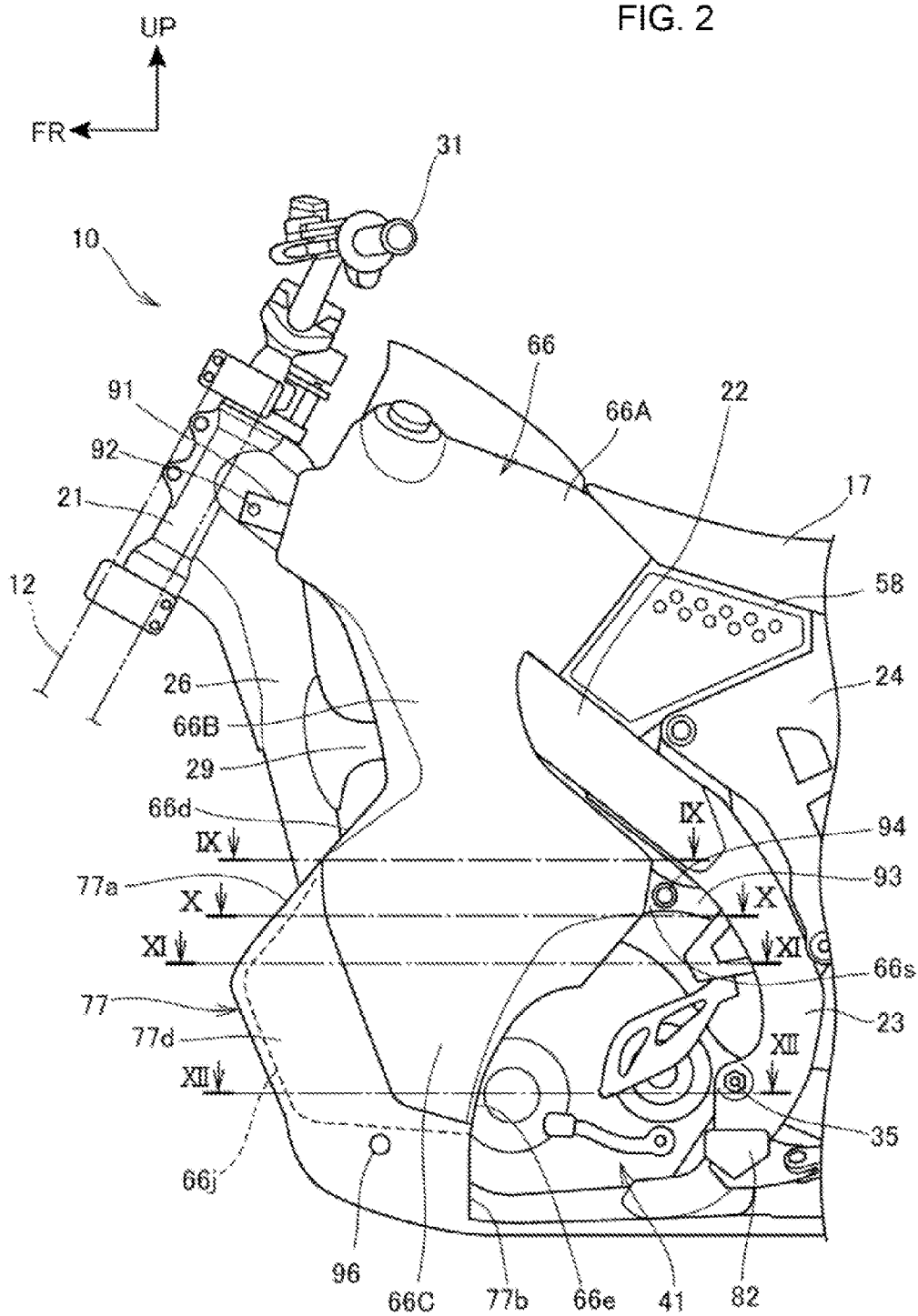
FIG. 2 is a fragmentary left side elevational view of a front portion of the motorcycle.

FIG. 2 is a fragmentary left side elevational view of a front portion of the motorcycle 10. A portion of the front fork 12, the front wheel 13, and the shroud 76 shown in FIG. 1 are omitted from illustration in FIG. 2.

As shown in FIG. 2, each of the front fuel tanks 66 includes in integral combination an upper tank section 66A, a middle tank section 66B, and a lower tank section 66C. The upper tank section 66A has a front end portion attached to the main frame 22 by a screw 92 through a tank bracket 91. The lower tank section 66C has a rear end portion 66s attached to the central frame 23 by a screw 94 through a tank bracket 93.

The upper tank section 66A is disposed over an area ranging from an outer side of the main frame 22 in the vehicle widthwise direction to the upper side of the main frame 22, with the air cleaner 58 being disposed behind the upper tank section 66A. The middle tank section 66B is of a constricted shape compared with the upper tank section 66A and the lower tank section 66C. The lower tank section 66C is positioned below the main frame 22 and the reinforcing frame 29.

The lower tank section 66C has a front end portion whose front and side areas are covered with the skid plate 77. The skid plate 77 has an upper wall 77a extending obliquely forwardly and downwardly so as to be contiguous to a front upper surface 66d of the lower tank section 66C. The skid plate 77 has a side wall 77b extending to a lower end rear edge 66e of the lower tank section 66C and secured to the lower tank section 66C by a screw 96.

Figure 3:
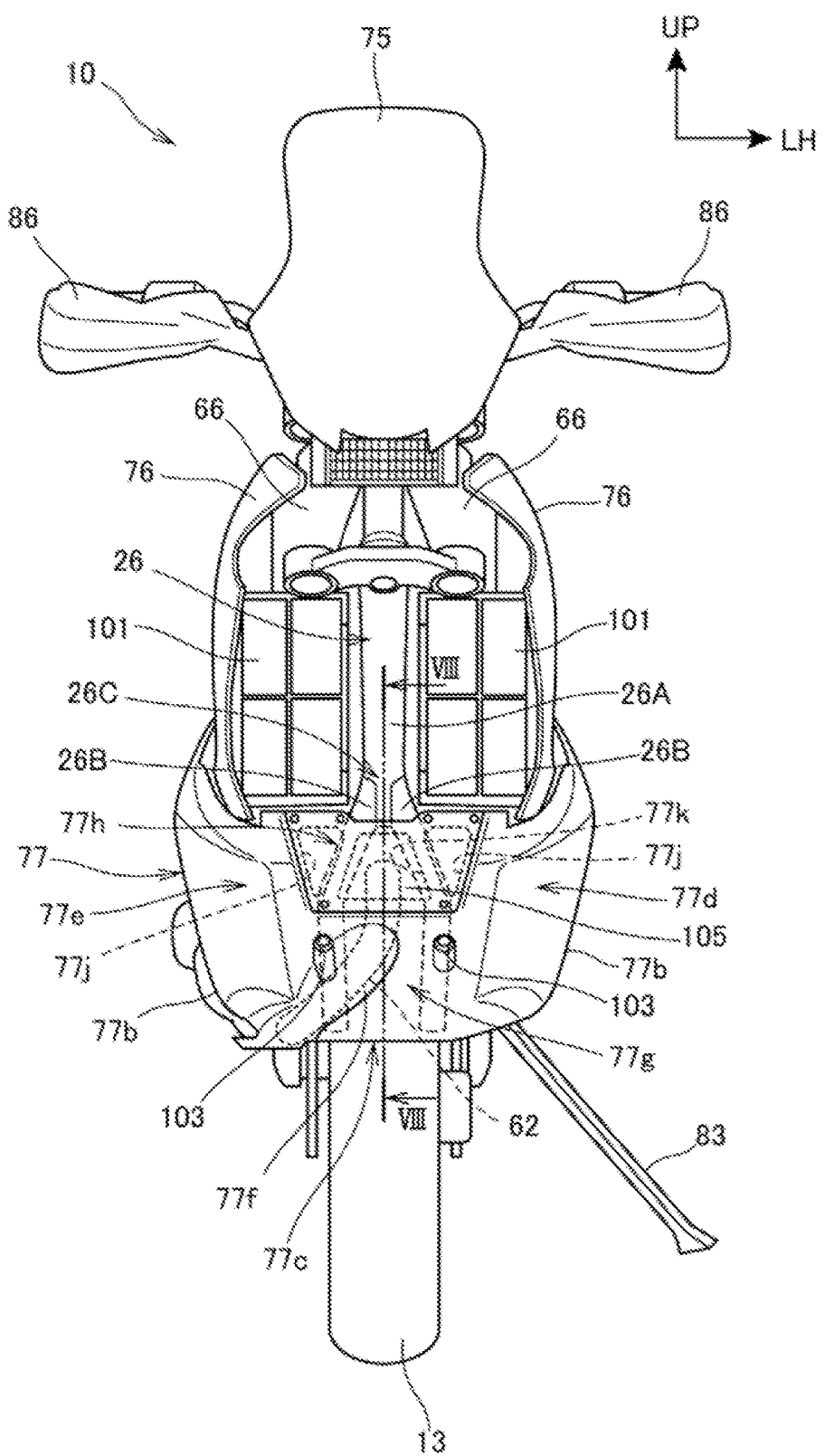
FIG. 3 is a front elevational view of the motorcycle.

FIG. 3 is a front elevational view of the motorcycle 10. A portion of the front fork 12 and the front wheel 13 shown in FIG. 1 is omitted from illustration in FIG 3.

As shown in FIG. 3, the down frame 26 includes the upper down frame portion 26A extending vertically straight as viewed in front elevation and the pair of left and right lower down frame portions 26B branched from the lower end portion of the upper down frame portion 26A and extending obliquely downwardly and laterally outwardly and further extending downwardly. The reference symbol 26C represents a branched area where the left and right lower down frame portions 26B are branched from the upper down frame portion 26A.

A pair of left and right radiators 101 are disposed on both sides of the down frame 26 and have outer sides covered respectively with the pair of left and right shrouds 76. The radiators 101, which are of a vertically elongate shape, are cooled by ram air directly applied thereto and ram air collected by the shrouds 76.

The skid plate 77 includes a centrally located front wall 77c, a pair of left and right first bulging portions 77d and 77e bulging forwardly from both sides of the front wall 77c, and a pair of left and right side walls 77b extending substantially rearwardly from respective lower edges of outer sides, in the vehicle widthwise direction, of the first bulging portions 77d and 77e.

The front wall 77c includes a lower front wall portion 77g having a second bulging portion 77f that bulges forwardly out of interference with the exhaust pipe 62 (see FIG. 1), and an upper front wall portion 77h extending upwardly from an upper edge of the lower front wall portion 77g. The lower front wall portion 77g is fixed to the lower down frame portions 26B by a plurality of bolts 103. The upper front wall portion 77h is a portion disposed below the radiators 101 and has a plurality of openings 77j and 77k. A mesh member 105 in the form of a metal screen is secured to the upper front wall portion 77h in covering relation to the openings 77j and 77k. The mesh member 105 has such a mesh size that it prevents mud water, earth, and sand, etc. scattered from the front from passing rearwardly therethrough and allows only ram air to pass therethrough.

Since the upper front wall portion 77h is of an air-permeable structure, it allows the engine 41 (see FIG. 1) and the exhaust pipe 62 (see FIG. 1) disposed behind the front wall 77c to be cooled by ram air that has passed through the upper front wall portion 77h.

The configuration of the skid plate 77 will be described below.

Figure 4:
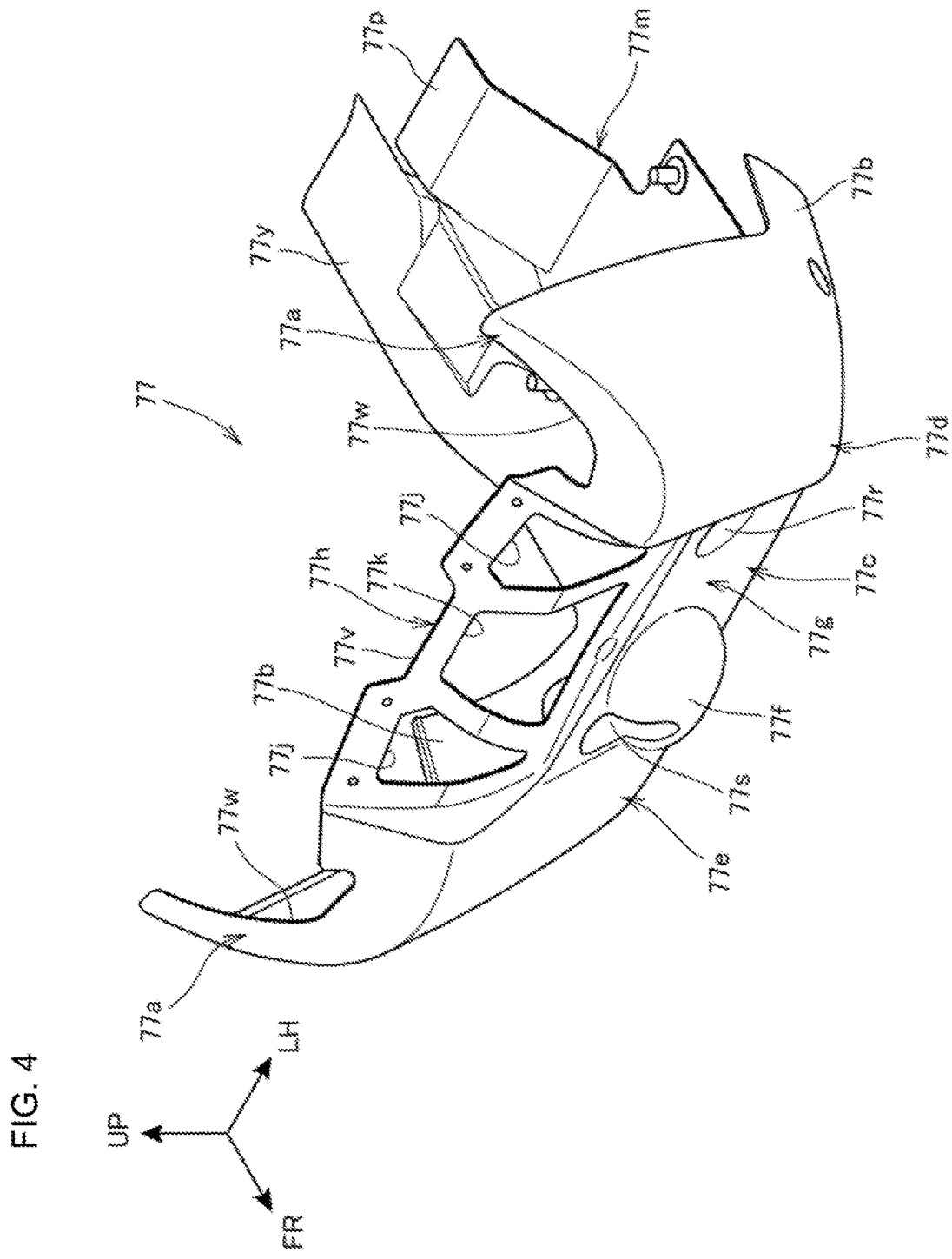
FIG. 4 is a perspective view of a skid plate.
Figure 5:
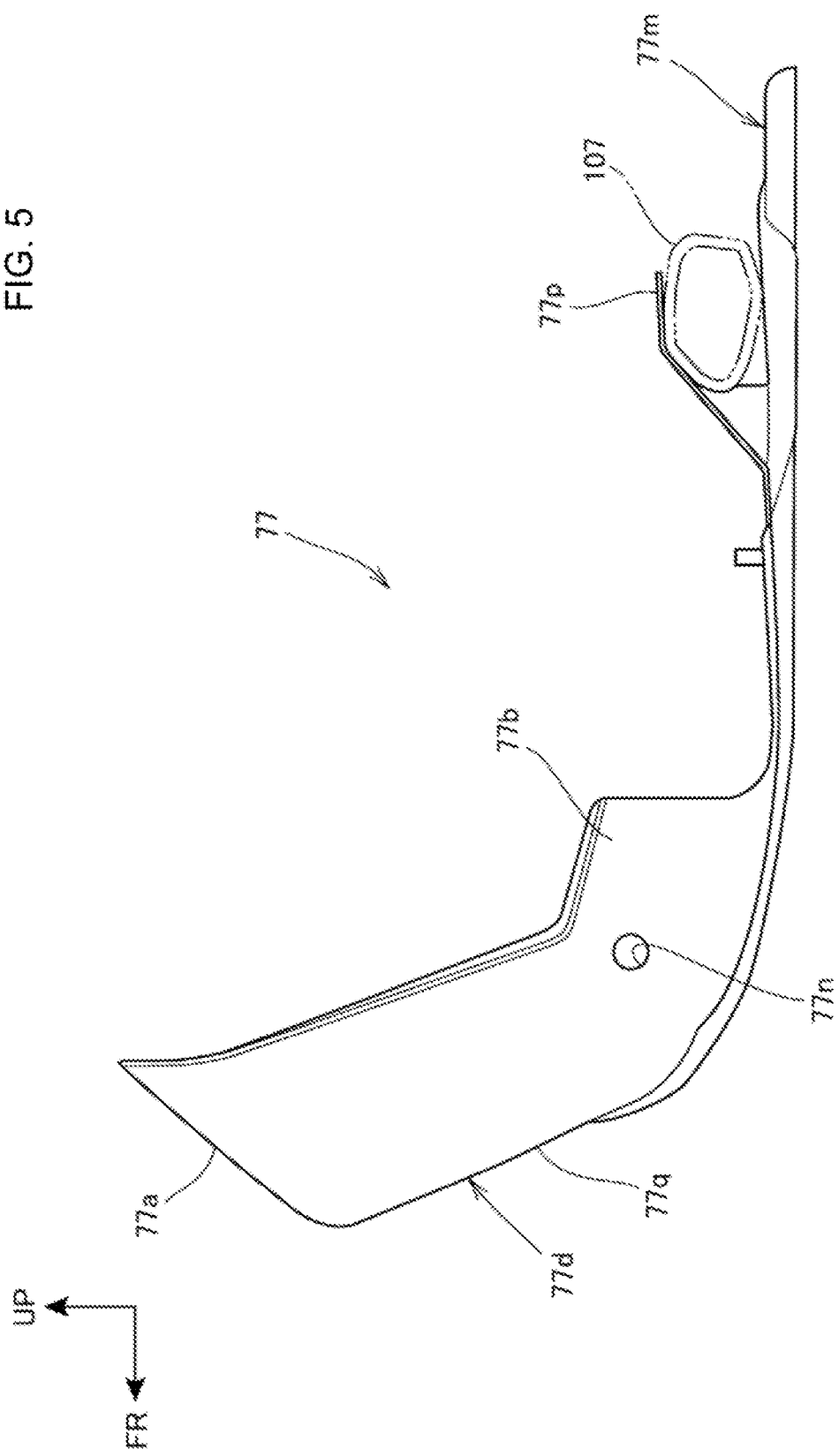
FIG. 5 is a side elevational view of the skid plate.
Figure 6:
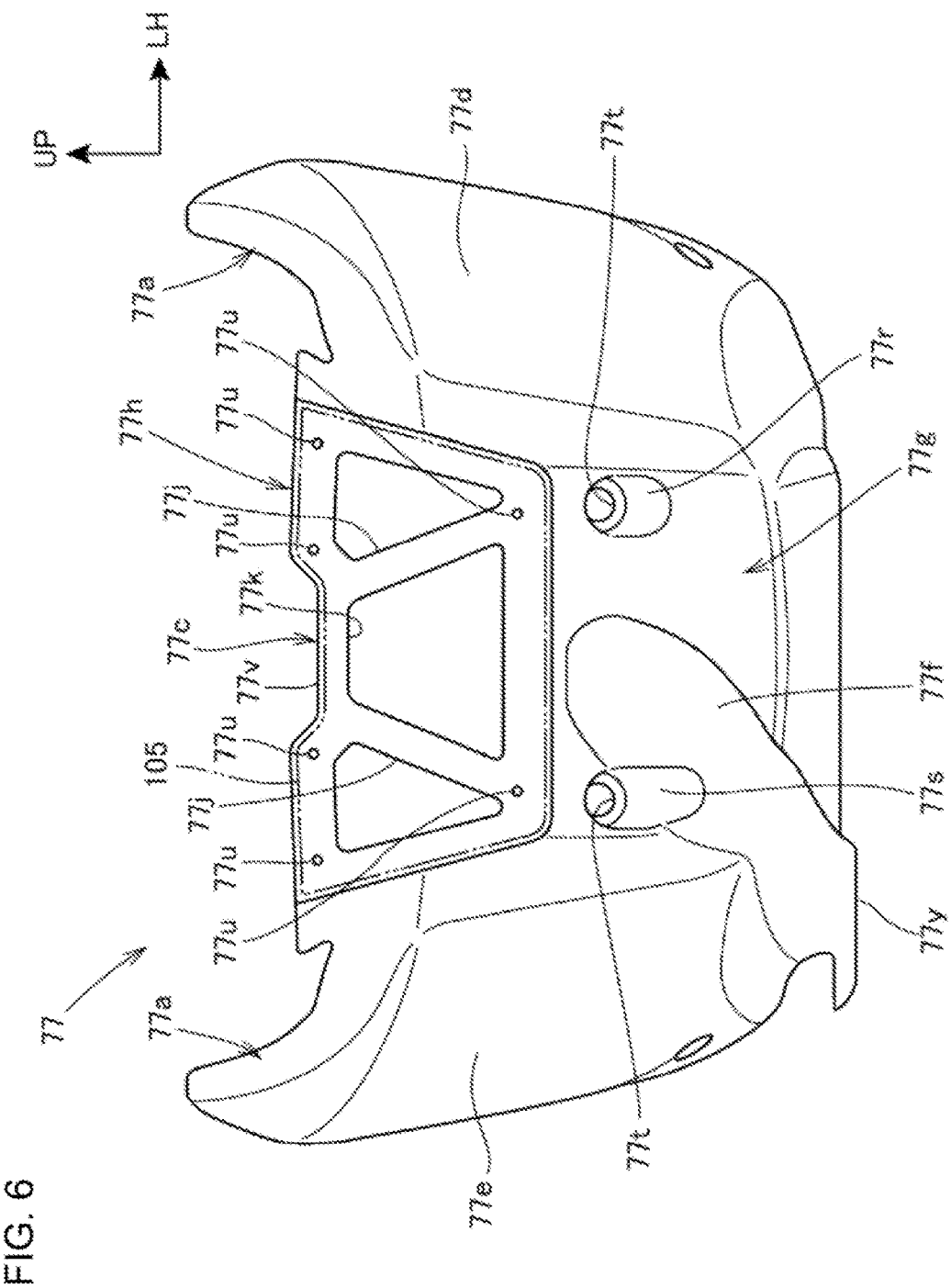
FIG. 6 is a front elevational view of the skid plate.
Figure 7:
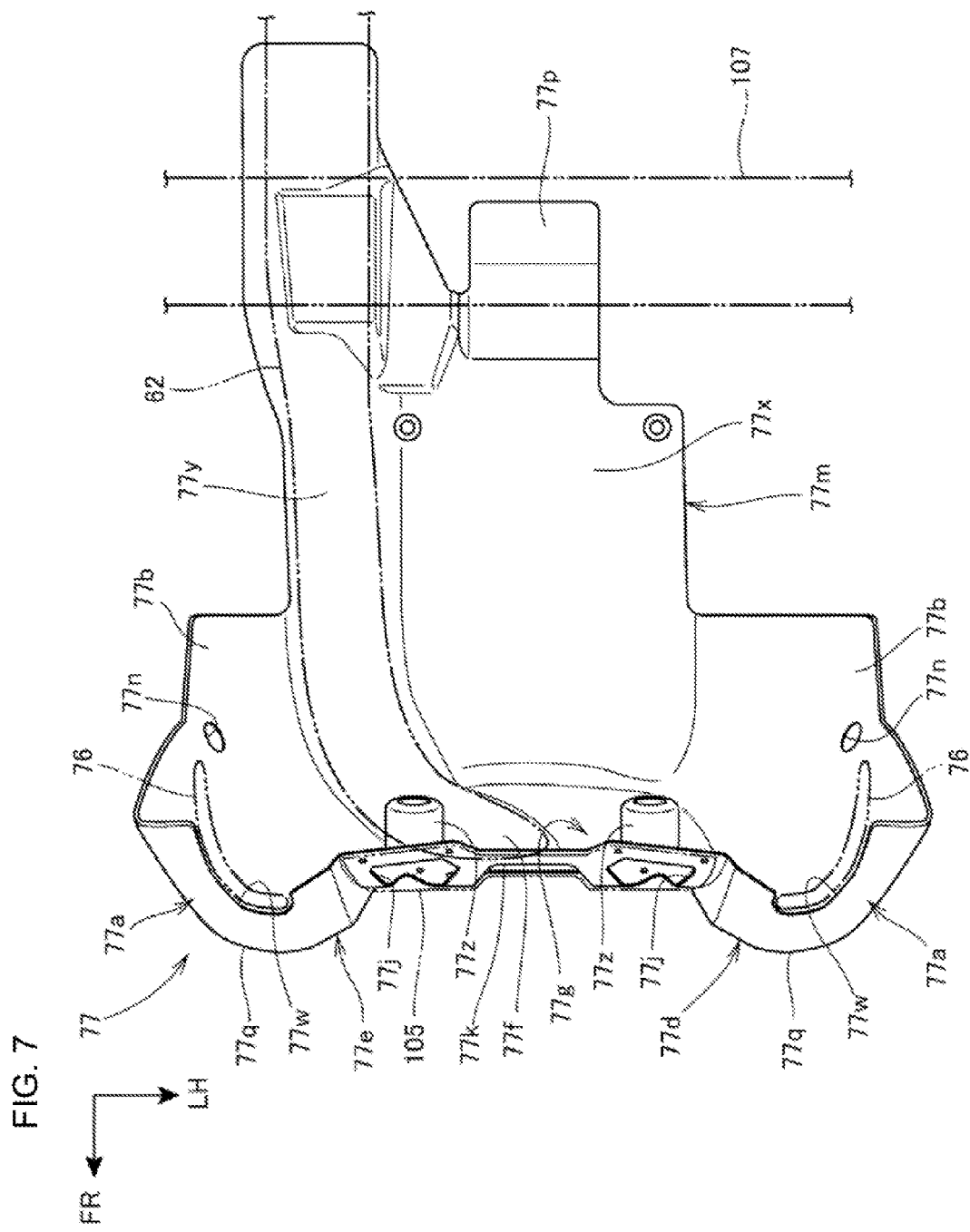
FIG. 7 is a plan view of the skid plate.

FIG. 4 is a perspective view of the skid plate 77, FIG. 5 a side elevational view of the skid plate 77, FIG. 6 a front elevational view of the skid plate 77, and FIG. 7 a plan view of the skid plate 77.

As shown in FIG. 4, the skid plate 77 includes in integral combination a pair of left and light upper walls 77a, the front will 77c, the pair of left and right first bulging portions 77d and 77e, the pair of side walls 77b, and a bottom wall 77m extending downwardly from lower edges of the front wall 77c, the first bulging portions 77d and 77e, and the side walls 77b.

As shown in FIG. 5, the upper walls 77a are inclined forwardly and downwardly, and the first bulging portions 77d and 77e (only the first bulging portion 77d closer to the viewer is shown in the figure) have front surfaces 77q inclined forwardly such that their upper ends are positioned forwardly of their lower ends. Therefore, the air resistance is smaller than if the upper walls and the front surfaces of the first bulging portions are vertical.

Screw insertion holes 77n for the passage therethrough of the screws 96 (see FIG. 2) for fastening the skid plate 77 to the front fuel tanks 66 (see FIG. 2) are defined substantially at boundaries between the side walls 77b and the first bulging portions 77d and 77e. The bottom wall 77m includes a protrusive member 77p on a rear portion thereof which projects upwardly and rearwardly. The protrusive member 77p engages a cross pipe 107 extending between the left and right central frames 23 (see FIG. 1) along the vehicle widthwise direction for preventing the bottom wall 77m from being displaced vertically.

As shown in FIG. 6, the second bulging portion 77f of the front wall 77c extends obliquely downwardly and rightwardly from an area that is slightly spaced to the right from the center, in the vehicle widthwise direction, of the lower front all portion 77g, along the exhaust pipe 62 (see FIG. 1). The lower front wall portion 77g has rearwardly dented cavities 77r and 77s for the passage therethrough of the bolts 103 (see FIG. 3) for attaching the skid plate 77 to the down frame 26 (see FIG. 1). The cavities 77r and 77s have respective through holes 77t defined in their bottoms. Rubber mounts 123 (see FIG. 12) are fitted in the through holes 77t.

One of the cavities 77r is dented rearwardly from a flat area of the lower front wall portion 77g, whereas the other cavity 77s extends into the flat area of the lower front wall portion 77g and the second bulging portion 77f.

The upper front wall portion 77h has a plurality of screw insertion holes 77u defined in peripheral edges thereof for the passage therethrough of screws for securing the mesh member 105 (see FIG. 3). The upper edge of the upper front wall portion. 77h has a substantially trapezoidal recess 77v defined centrally therein for preventing the upper front wall portion 77h from interfering with the upper down frame portion 26A (see FIG. 3).

As shown in FIG. 7, the left and right upper walls 77a, have recesses 77w defined therein for positioning lower end portions of the left and right shrouds 76 in the vehicle widthwise direction and longitudinal direction. The recesses 77w are defined along front edges of the upper walls 77a, i.e., the front surfaces 77q of the first bulging portions 77d and 77e.

The recesses 77r and 77s (see FIG. 6) are defined in respective projections 77z that project rearwardly from the lower front wall portion 77g.

The bottom wall 77m is disposed inwardly of the left and right side walls 77b in the vehicle widthwise direction, and includes a central bottom wall portion 77x serving as a central section in the vehicle widthwise direction, and a right extension 77y extending in the longitudinal direction contiguously to a right side edge of the central bottom wall portion 77x.

The central bottom wall portion 77x includes the protrusive member 77p on a rear portion thereof. The right extension 77y is an extension from the second bulging portion 77f of the lower front wall portion 77g, and covers a lower portion of the exhaust pipe 62.

Figure 8:
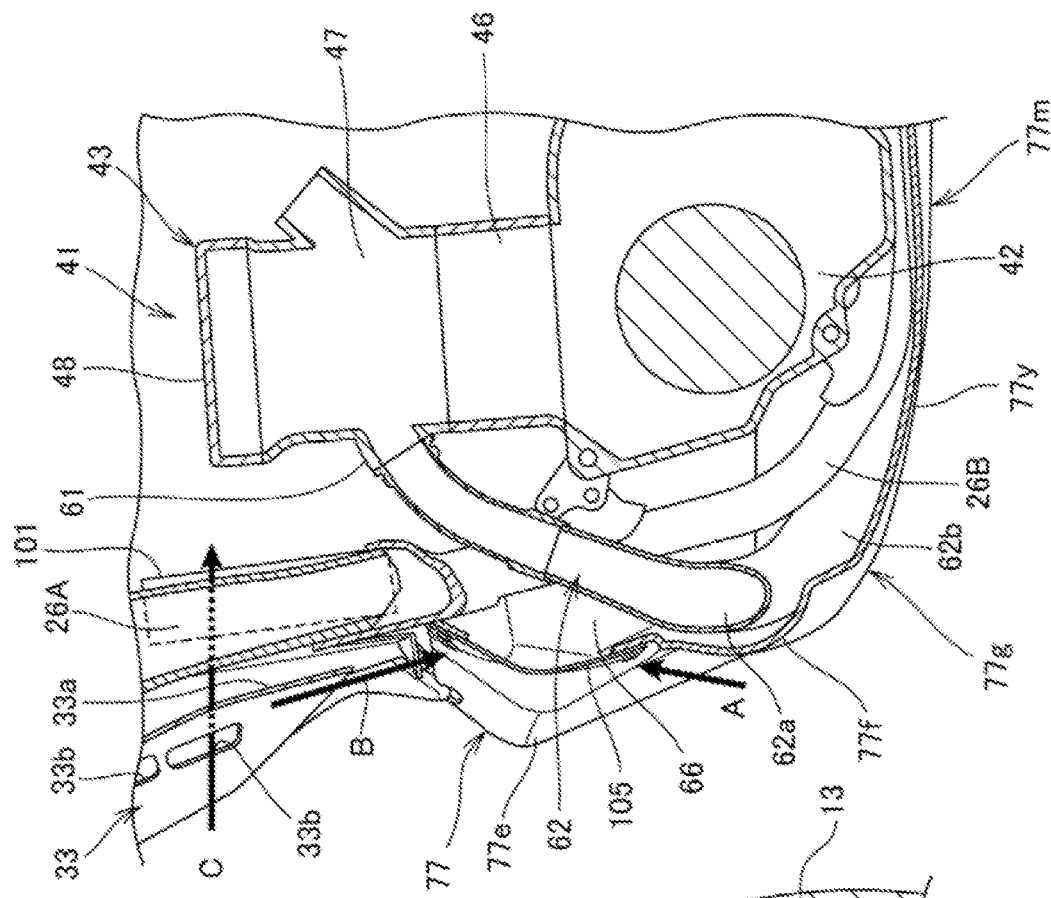
FIG. 8 is a cross-sectional view taken along line VIII-VIII of FIG. 3.

FIG. 8 is a cross-sectional view taken along line VIII-VIII of FIG. 3.

The exhaust pipe 62 extends obliquely downwardly and forwardly from the exhaust manifold 61 that is mounted on the front surface of the cylinder head 47 of the engine 41, is curved rightwardly in the vehicle widthwise direction at a first curved portion 62a, and then is curved rearwardly at a second curved portion 62b. The skid plate 77 includes a portion disposed at the second curved portion 62b and behind the second curved portion 62h and extending closely to the exhaust pipe 62 from a position in the vicinity of the first curved portion 62a, and covers a front or lower portion of the exhaust pipe 62. The skid plate 77 thus protects the exhaust pipe 62 as well as the bottom of the engine 41 from pebbles, stumps, etc. on the road on which the motorcycle 10 travels.

The second bulging portion 77f of the skid plate 77 has its cross section curved so as to be forwardly projecting and the curved cross section has an upper portion inclined obliquely upwardly and rearwardly. Therefore, the second bulging portion 77f is able to guide part of ram air applied thereto toward the mesh member 105 as indicated by an arrow A. As a result, the amount of ram air that passes through the mesh member 105 increases for promoting the cooling of the engine 41, the exhaust pipe 62, and the front fuel tanks 66.

The mesh member 105 is disposed forwardly of the engine 41, or more specifically substantially forwardly of the crankcase 42 and the cylinder block 46 of the engine 41. The cylinder block 46 is a component whose temperature becomes highest in the engine 41 because pistons move back and forth vertically in cylinder bores defined in the cylinder block 46 and the exhaust pipe 62 that extends from the cylinder head 47 is positioned forwardly of the cylinder block 46. Though the engine 41 is water-cooled with a coolant flowing through a water jacket defined in the cylinder block 46, the cooling effect on the engine 41 is further increased by cooling the outer wall of the cylinder block 46 with the ram it that has passed through the mesh member 105.

Since the mesh member 105 is disposed in a position where a lower end portion 33a of the front fender 33, which is of a substantially arcuate gutter shape, is oriented obliquely rearwardly and downwardly, ram air collected by the front fender 33 is guided toward the mesh member 105 as indicated by an arrow B and supplied through the mesh member 105 to the engine 41. Therefore, the cooling effect on the engine 41 is further increased.

The front fender 33 has a plurality of vertically elongated vent holes 33b defined in both outer edge portions of the lower end portion 33a in the vehicle widthwise direction. Consequently ram air passes through the radiators 101 via the vent holes 33b as indicated by an arrow C and is applied to the cylinder section 43 for promoting the cooling.

Figure 9:
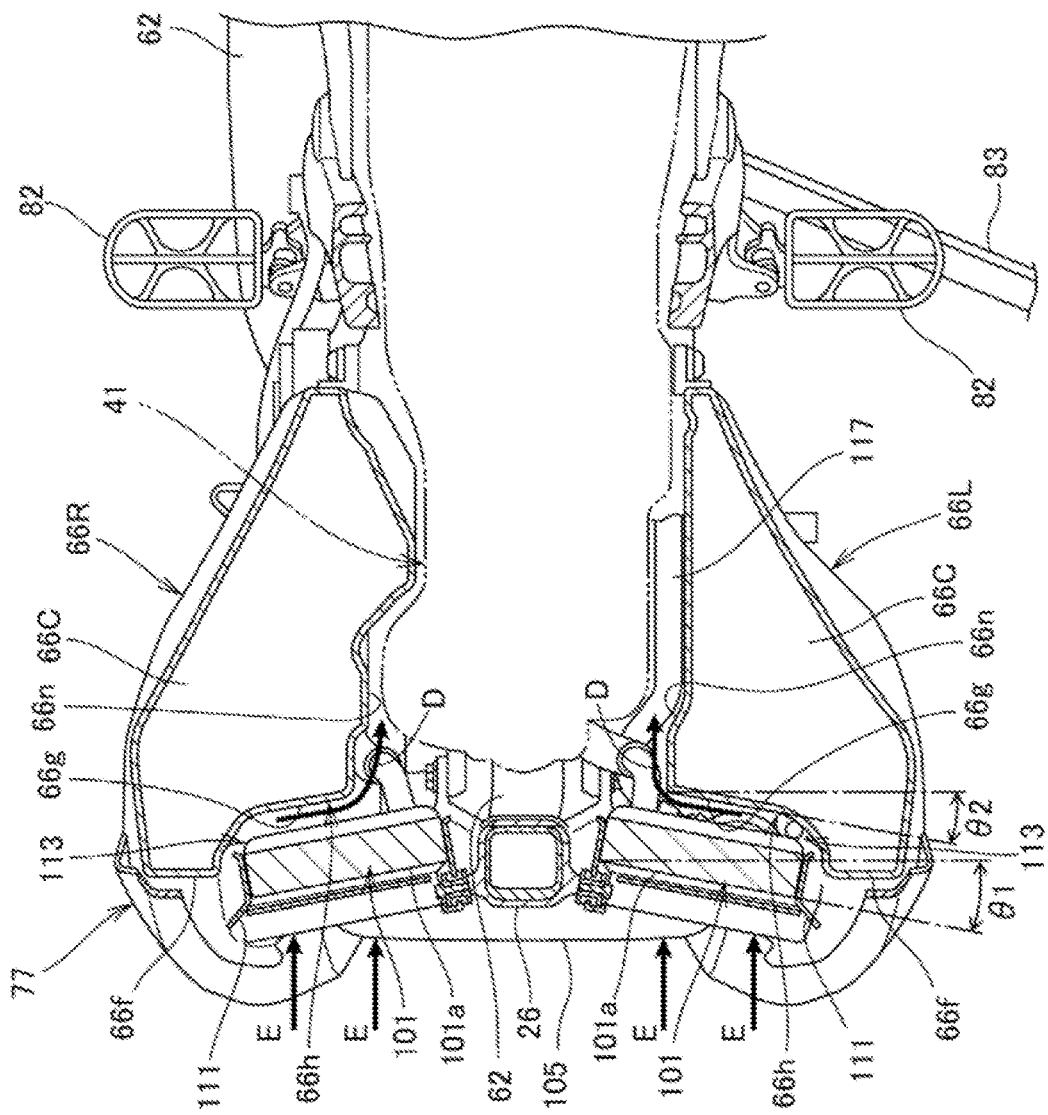
FIG. 9 is a cross-sectional view taken along line IX-IX of FIG. 2.

FIG. 9 is a cross-sectional view taken along line IX-IX of FIG. 2, showing a cross section taken along a horizontal plane passing through lower portions of the pair passing of left and right radiators 101. The left and right front fuel tanks 66 (see FIG. 2) are herein referred to as front fuel tanks 66L and 66R.

The left and right radiators 101 are fixed to both sides of the down frame 26, and are disposed outwardly of the down frame 26 in the vehicle widthwise direction and disposed in respective tank cavities 66h defined in the front fuel tanks 66L and 66R. Each of the radiators 101 is inclined such that an outer side thereof in the vehicle widthwise direction is positioned forwardly of an inner side thereof in the vehicle widthwise direction. An angle at which front surfaces 101a of the radiators 101 are inclined to the vehicle widthwise direction is represented by θ1.

Since the radiators 101 are thus inclined, they make ram air applied to the front surfaces 101a thereof less likely to escape outwardly in the vehicle widthwise direction, increasing the amount of ram air that passes through the radiators 101. Furthermore, guide plates 111 that extend obliquely forwardly and outwardly are mounted on side edge portions of the front surfaces 101a of the radiators 101. The guide plates 111 are effective to guide ram air flowing outwardly of the radiators 101 in the vehicle widthwise direction, toward the radiators 101. Therefore, the amount of ram air that passes through the radiators 101 is increased for a higher cooling effect.

The tank cavities 66h are defined in front walls 66f and inner walls 66n of the front fuel tanks 66L and 66R, and have rear surfaces 66g inclined at an angle θ2 that is substantially the same as the angle θ1 at which the front surfaces 101a of the radiators 101 are inclined. The mesh member 105 is disposed in overlapping relation to respective inner sides, in the vehicle widthwise direction, of the left and right tank cavities 66h along the vehicle longitudinal direction.

Gaps 113 are defined between the radiators 101 and the rear surfaces 66g of the tank cavities 66h. As indicated by arrows D, ram air can flow from outside in the vehicle widthwise direction through the gaps 113 toward the engine 41 that is located inside in the vehicle widthwise direction. As indicated by arrows E, discharged air that has passed through the radiators 101 from their front can flow through the gaps 113 toward a central area, in the vehicle widthwise direction, of the engine 41. Therefore, the amount of ram air that flows between the left and right front fuel tanks 66L and 66R increases to effectively cool the central area of the engine 41 where heat tends to stay trapped.

As described above, inasmuch as the tank cavities 66h are able to collect ram air for cooling the front fuel tanks 66L and 66R therewith, the fuel in the front fuel tanks 66L and 66R is prevented from volatilizing. Consequently, the front fuel tanks 66L and 66R can be placed closely to the engine 41 and the exhaust pipe 62.

Figure 10:
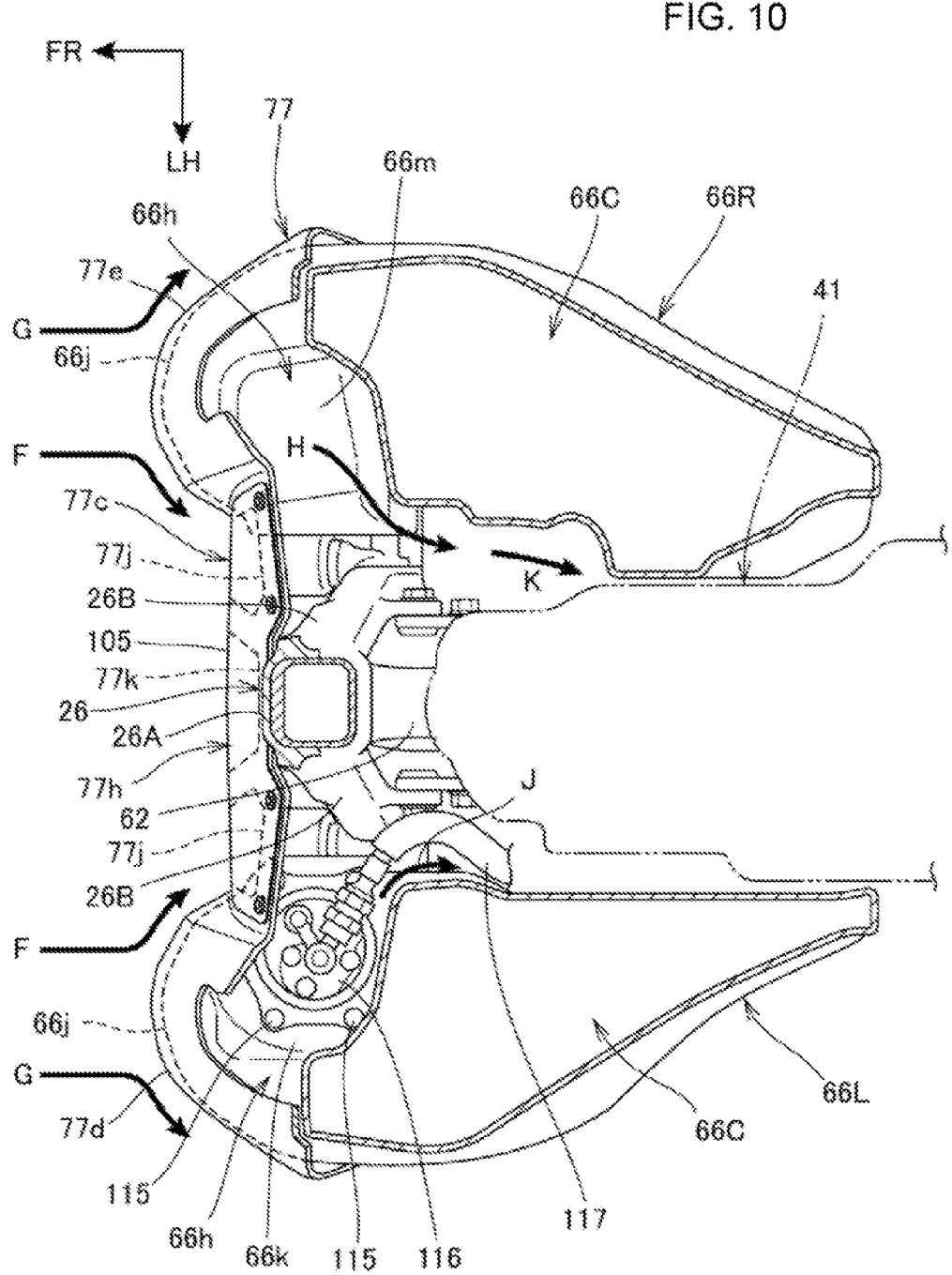
FIG. 10 is a cross-sectional view taken along line X-X of FIG. 2.

FIG. 10 is a cross-sectional view taken along line X-X of FIG. 2, showing a cross section taken along a horizontal plane passing between the front wall 77c of the skid plate 77 and the radiators 101 (see FIG. 9).

The respective lower tank sections 66C of the front fuel tanks 66L and 66R have bulging tank portions 66j that bulge forwardly. The bulging tank portions 66j are disposed respectively in the first bulging portions 77d and 77e of the skid plate 77. The first bulging portions 77d and 77e are disposed closely along respective front surfaces of the bulging tank portions 66j.

The front fuel tanks 66L and 66R have bottom surfaces 66k and 66m disposed in the respective tank cavities 66h, and a fuel pump 116 is fixed to the bottom surface 66k of the left front fuel tank 66L by a plurality of bolts 115. To an upper portion of the fuel pump 116, there is connected an outlet fuel pipe 117 that extends to fuel injection valves (not shown) disposed in the intake device 51 (see FIG. 1). The outlet fuel pipe 117 is disposed closely along the inner wall 66n of the left front fuel tank 66L. The left and right front fuel tanks 66L and 66R are connected to each other by a fuel hose disposed between the lower surfaces thereof and the skid plate 77.

Since the skid plate 77 has the first bulging portions 77d and 77e on both left and right sides of the mesh member 105, rain air that is applied to the first bulging portions 77d and 77e is guided toward the mesh member 105 by inner inclined portions, in the vehicle widthwise direction, of the first bulging portions 77d and 77e, as indicated by arrows F. The ram air then flows through the mesh member 105 toward the engine 41, thereby cooling the engine 41, etc. At this time, the rain air is also caused by the first bulging portions 77d and 77e to flow outwardly, in the vehicle widthwise direction, of the first bulging portions 77d and 77e, as indicated by arrows G. As a result, the speed at which the ram air flows as indicated by the arrows F and G increases. The air resistance of the vehicle body is thus made smaller than if there were no first bulging portions 77d and 77e, i.e., both left and right sides of the mesh member 105 were flat surfaces perpendicular to the flow of ram air.

The second bulging portion 77f (see FIG. 8) is able to guide ram air that has been collected to a central area, in the vehicle widthwise direction, of the skid plate 77 by the first bulging portions 77d and 77e, toward the mesh member 105.

As the mesh member 105 can supply rain air toward the engine 41 after having removed mud, earth, sand, etc. therefrom, the engine 41 is less liable to become dirty and a high cooling effect is maintained on the engine 41.

Since the front fuel tanks 66L and 66R have the bulging tank portions 66j disposed inside the first bulging portions 77d and 77e, the capacity of the front fuel tanks 66L and 66R is increased.

The tank cavities 66h provided in the respective front fuel tanks 66L and 66R are effective to increase the surface areas of the front fuel tanks 66L and 66R for higher heat radiation. Therefore, the front fuel tanks 66L and 66R can effectively be cooled by ram air. The fuel in the front fuel tanks 66L and 66R is thus prevented from being vaporized, so that air bubbles are prevented from entering the fuel pump 116 and fuel supply passages. Accordingly the fuel can smoothly be supplied to the engine 41. Arrows H, J and K represent flows of ram it that pass through the tank cavities 66h. Ram air is collected by the tank cavities 66h and flows rearwardly between the left and light front fuel tanks 66L and 66R for thereby cooling the front fuel tanks 66L and 66R engine 41, etc.

Figure 11:
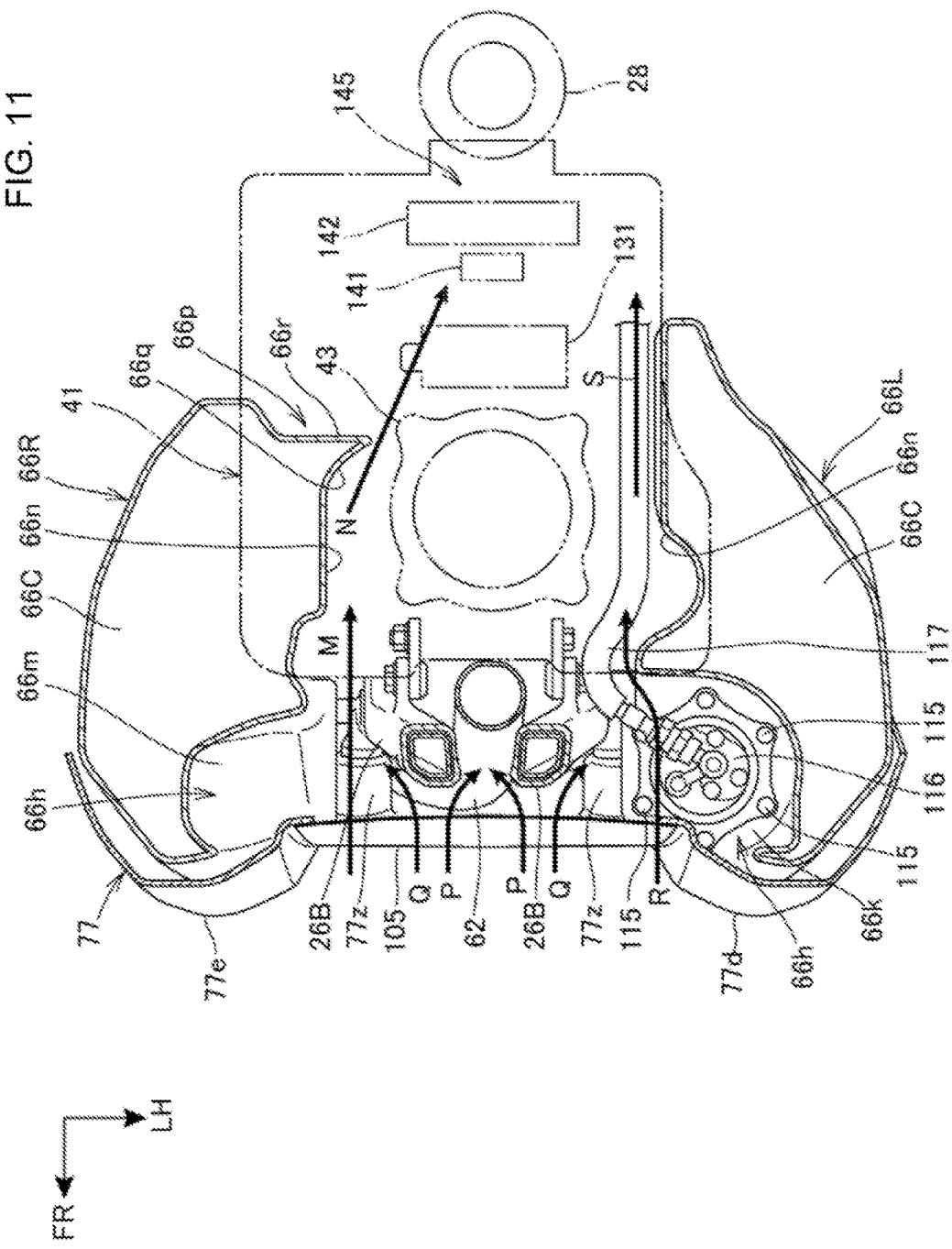
FIG. 11 is a cross-sectional view taken along line XI-XI of FIG. 2.
Figure 12:
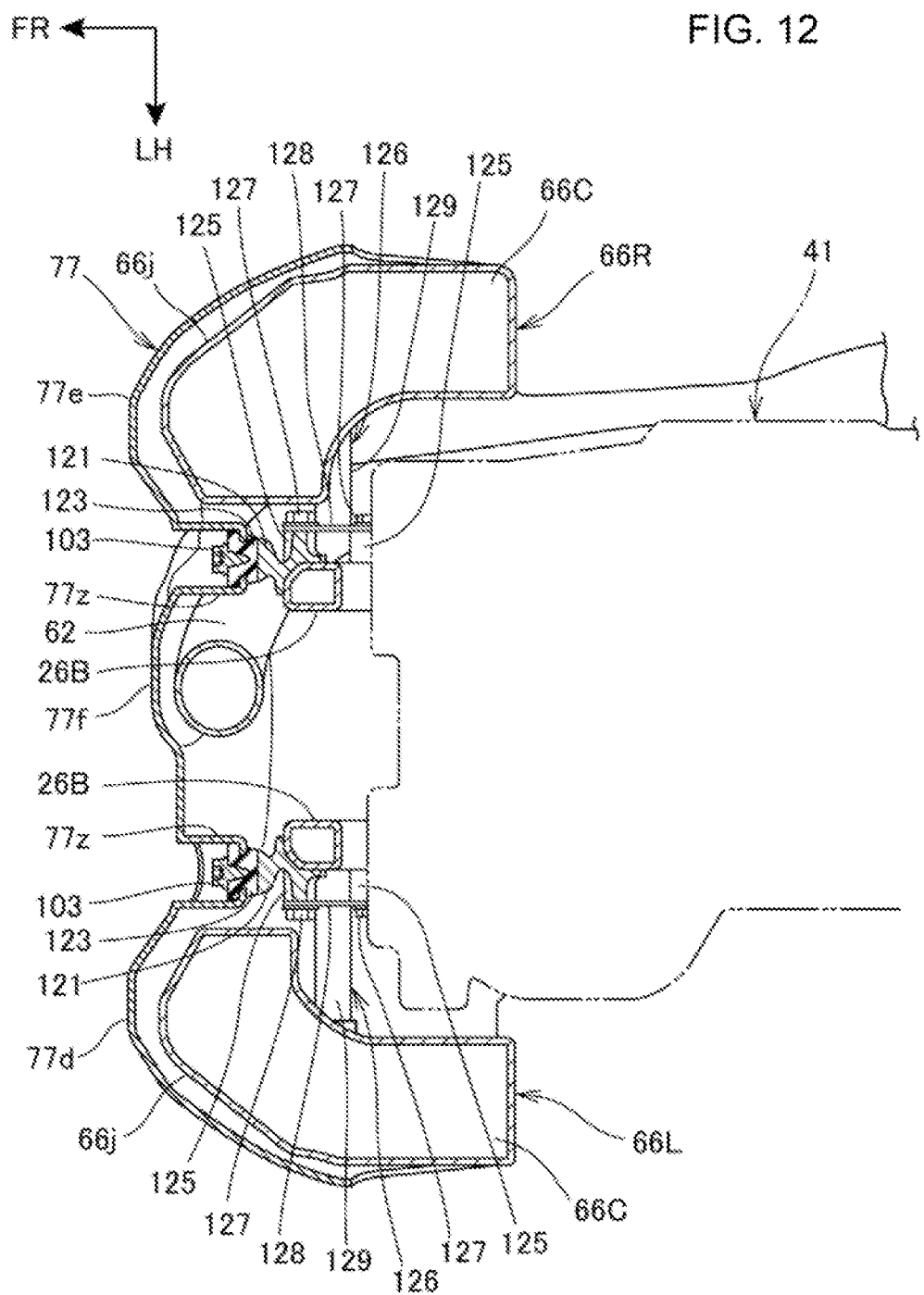
FIG. 12 is a cross-sectional view taken along line XII-XII of FIG. 2.

FIG. 11 is a cross-sectional view taken along line XI-XI of FIG. 2, showing across section taken along a horizontal line passing through the mesh member 105. FIG. 12 is a cross-sectional view taken along line XII-XII of FIG. 2, showing a cross section taken along a horizontal line passing through a position at the height of a crankshaft (not shown) of the engine 41.

As shown in FIG. 11, the exhaust pipe 62 is disposed so as to extend longitudinally between the left and right lower down frame portions 26B. The exhaust pipe 62 and the cylinder section 43 are disposed rearwardly of the mesh member 105. The outlet fuel pipe 117 is disposed so as to extend longitudinally between the cylinder section 43 and the left front fuel tank 66L.

A starter motor 131 mounted on the crankcase 42 (see FIG. 1) is disposed rearwardly of the cylinder section 43.

Two ECUs (engine control units) 141 and 142 that are supported on the left and right central frames 23 (see FIG. 2) by stays (not shown) are disposed rearwardly of the starter motor 131. The rear cushion unit 28 is disposed rearwardly of the ECUs 141 and 142.

The inner wall 66n of the right front fuel tank 66R has on a rear end portion thereof an inner wall protrusion 66p projecting inwardly in the vehicle widthwise direction. The inner wall protrusion 66p has a front surface 66q which is of an arcuate cross-sectional shape extending inwardly in the vehicle widthwise direction progressively in a rearward direction, and a rear surface 66r extending in the vehicle widthwise direction.

Ram air that passes from the front of the vehicle through the mesh member 105 toward the engine 41 as indicated by an arrow M is caused by the inner wall protrusion 66p to flow obliquely rearwardly and leftwardly between the cylinder section 43 and the inner wall 66n, as indicated by an arrow N, cooling the starter motor 131 and the two ECUs 141 and 142.

Ram air that passes through the mesh member 105 is divided into left and right streams by the left and right lower down frame portions 26B and flows toward the engine 41, as indicated by arrows P and Q. Ram air that passes through the tank cavity 66h of the left front fuel tank 66L flows rearwardly between the front fuel tank 66L and the cylinder section 43, as indicated by arrows R and S.

The left front fuel tank 66L has a rear end extending more rearwardly than the right front fuel tank 66R. The rear end of the left front fuel tank 66L lies substantially in alignment with the rear end of the starter motor 131 disposed behind the cylinder section 43, in the vehicle longitudinal direction. The rear end of the right front fuel tank 66R lies substantially in alignment with the rear end of the cylinder section 43 in the vehicle longitudinal direction. Since the front fuel tanks 66L and 66R are disposed on the left and right sides, the left and right front fuel tanks 66L and 66R may be different in shape from each other depending on the layout of left and right components in the vehicle body, so that they may have an increased tank capacity.

As shown in FIG. 12, the respective bulging tank portions 66j of the front fuel tanks 66L and 66R are disposed rearwardly of and along the first bulging portions 77d and 77e of skid plate 77. The both sides of the engine 41 has their front portions covered with the bulging tank portions 66j.

Support brackets 121 are fixed to the respective left and right lower down flame portions 26B. The skid plate 77 is fastened to the support brackets 121 by the bolts 103. Specifically, the projections 77z of the skid plate 77 are supported on the support brackets 121 with the rubber mounts 123 interposed therebetween. In other words, the skid plate 77 is elastically supported by the rubber mounts 123.

The left and right lower down frame portions 26B have a pair of respective bosses 125 projecting laterally. Stays 126 are attached to the bosses 125, and the front fuel tanks 66L and 66R have lower portions supported by distal ends of the stays 126. A stay 126 includes a plate 128 mounted on the bosses 125 by a plurality of bolts 127 and a pipe-shaped stay body 129 extending outwardly in the vehicle widthwise direction. The plates 128 are also supported by the support brackets 121.

Since the skid plate 77 is elastically supported on the vehicle frame 11, as described above, the impact of pebbles or the like which may hit the skip plate 77 is reduced, thereby preventing the skid plate 77 from being damaged.

As the skid plate 77 and the stays 126 are supported by the support brackets 121, the number of parts used is made smaller than if the skid plate 77 and the stays 126 are supported by separate members, resulting in a reduction in the cost.

Figure 13:
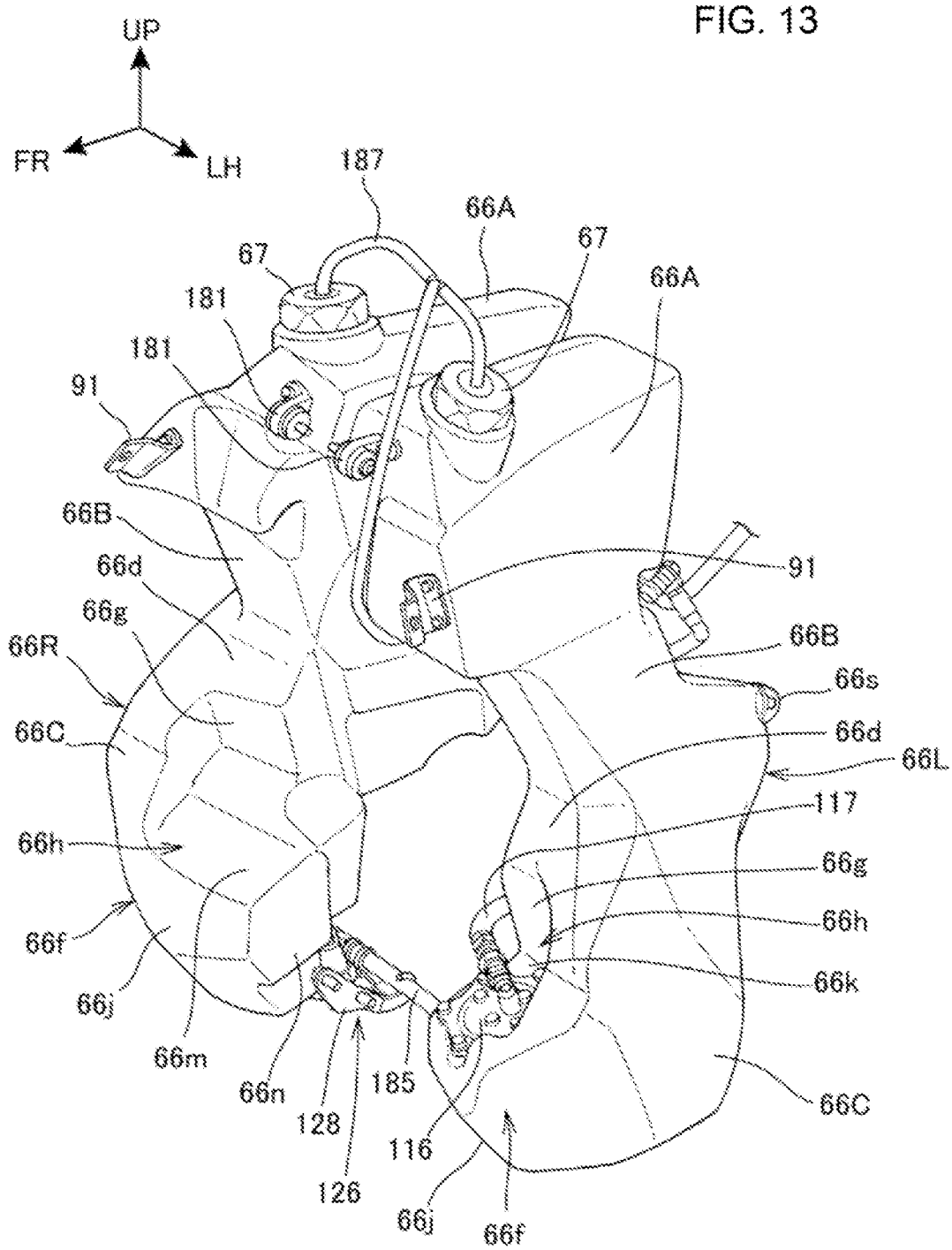
FIG. 13 is a perspective view of front fuel tanks.
Figure 14:
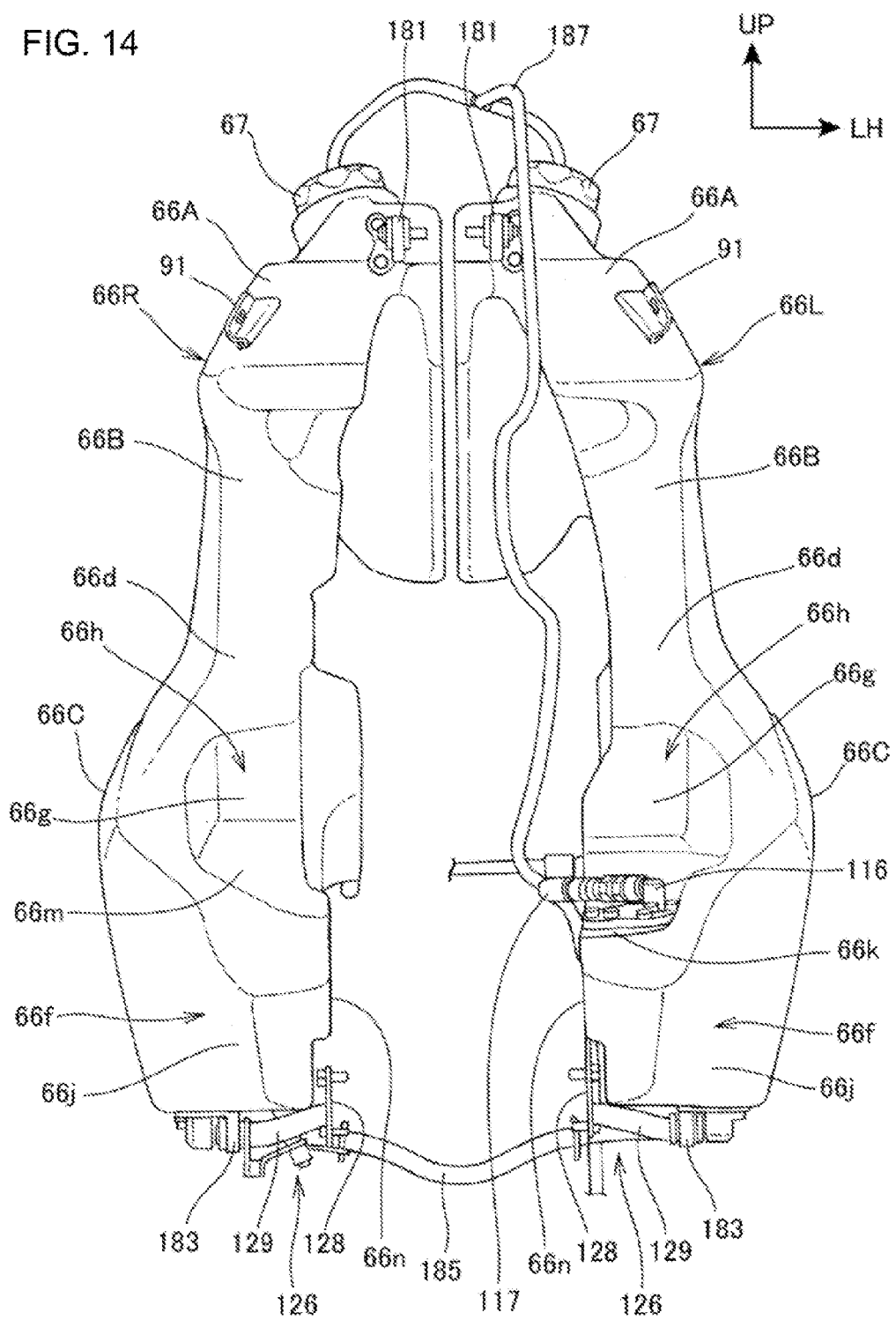
FIG. 14 is a front elevational view of the front fuel tanks.

FIG. 13 is a perspective view of the front fuel tanks 66L and 66R, and FIG. 14 is a front elevational view of the front fuel tanks 66L and 66R.

As shown in FIGS. 13 and 14, the front fuel tanks 66L and 66R are substantially of a bilaterally symmetrical shape. The left and right upper tank sections 66A are fixed to the respective main frames 22 (see FIG. 1) by the tank brackets 91 and fastening members 181 on upper front portions thereof. The left and right lower tank sections 66C have respective bottoms fixed to the lower down frame portions 26B (see FIG. 12) by the stays 126. The rear end portions 66s are fixed to the respective central frames (see FIG. 2) by the tank brackets 93. The reference symbol 183 (see FIG. 14) represents stay fixing members disposed on the respective bottoms of the front fuel tanks 66L and 66R for fixing the stay bodies 129 of the stays 126.

The left and right front fuel tanks 66L and 66R are connected to each other by a connection hose 185 that is coupled to the respective bottoms thereof. The fuel in the right front fuel tank 66R is introduced through the connection hose 185 into the left front fuel tank 66L by suction forces from the fuel pump 116. The reference symbol 187 represents a breather hose having ends on one side attached to the left and right caps 67 to connect the caps 67 to each other and extending downwardly from a position between the caps 67. The breather hose 187 has a lower end vented to the atmosphere to keep a constant pressure in the front fuel tanks 66L and 66R.

As shown in FIGS. 1, 3, 4 and 10, in the cooling structure for the motorcycle 10 as a saddle-type vehicle including the main frames 22 extending obliquely rearwardly and downwardly from the head pipe 21, the engine 41 supported on the main frames 22, the exhaust pipe 62 extending rearwardly from the front portion of the engine 41, the front fuel tanks 66 disposed as fuel tanks laterally of the engine 41, and the skid plate 77 covering the front portions of the engine 41 and the exhaust pipe 62, the skid plate 77 having the openings 77j and 77k defined in the central upper portion thereof for introducing ram air from the front of the vehicle toward the engine 41, the openings 71j and 77k are covered with the mesh member 105, the skid plate 77 has the first bulging portions 77d and 77e bulging forwardly laterally of the openings 77j and 77k, the front fuel tanks 66 include the bulging tank portions 66j disposed rearwardly of and along the first bulging portions 77d and 77e and covering front portions of the engine 41, so that ram air guided toward the central area in the vehicle widthwise direction by the first bulging portions 77d and 77e passes through the mesh member 105 and the openings 77j and 77k to cool the exhaust pipe 62 and the engine 41.

With the above arrangement, since the front fuel tanks 66 have the bulging tank portions 66j, the capacity of the front fuel tanks 66 is increased, and the rain air is collected to the central area in the vehicle widthwise direction by the first bulging portions 77d and 77e of the skid plate 77 to effectively cool the exhaust pipe 62, the engine 41, and the front fuel tanks 66.

As shown in FIGS. 3 and 6, the skid plate 77 includes on the central lower portion thereof the second bulging portion 77f that bulges forwardly along the exhaust pipe 62, and the second bulging portion 77f is disposed below the mesh member 105. Therefore, the second bulging portion 77f collects ram air that is applied to the skid plate 77 below the mesh member 105 toward the mesh member 105 disposed thereabove for effectively cooling the exhaust pipe 62 and the engine 41.

As shown in FIG. 9, the front fuel tanks 66 include the tank cavities 66h defined as dented portions of the front walls 66f and the inner walls 66n. The mesh member 105 overlaps at least portions of the tank cavities 66h in the vehicle longitudinal direction. Ram air that has passed through the mesh member 105 is collected to the central area in the vehicle widthwise direction by the tank cavities 66h. Therefore, the ram air that has passed through the mesh member 105 is prevented from being dispersed, but is collected to the central area in the vehicle widthwise direction for effectively cooling the exhaust pipe 62 and the engine 41.

As shown in FIG. 8, the front fender 33 that covers the upper portion of the front wheel 13 is disposed forwardly of the skid plate 77. The front fender 33 is of a shape substantially along the outer profile of the front wheel 13 and has its lower end portion oriented toward the mesh member 105 for guiding ram air toward the mesh member 105. Therefore, since ram air flowing along the front fender 33 is guided toward the mesh member 105, it is possible to collect more ram air to the mesh member 105 for effectively cooling the exhaust pipe 62 and the engine 41.

As shown in FIGS. 3, 8 and 11, the down frame 26 that extends substantially downwardly from the head pipe 21 is disposed below the main frames 22. The down frame 26 has the branched area 26C where the down frame 26 is branched into the left and right portions in the vicinity of the upper edge of the mesh member 105. Since the exhaust pipe 62 extends forwardly from the engine 41 so as to pass between the left and right portions of the down frame 26 below the branched area 26C, the exhaust pipe 62 can be located closely to the mesh member 105 by extending forwardly of the clown frame 26. Therefore, ram air that is collected by the skid plate 77 can cool the exhaust pipe 62 immediately after it has passed through the mesh member 105, so that the exhaust pipe 62 can effectively be cooled by ram air that has not been warmed.

As shown in FIG. 9, the radiators 101 are disposed in the tank cavities 66h upwardly of the skid plate 77 such that each of the radiators 101 is inclined such that the inner side thereof in the vehicle widthwise direction is positioned rearwardly of the outer side thereof in the vehicle widthwise direction. Inasmuch as the rear surfaces 66g of the tank cavities 66h are spaced rearwardly of the radiators 101 and extend along the inclination of the radiators 101, the rear surfaces 66g can smoothly guide discharged air from the radiators 101 to the central area in the vehicle widthwise direction, so that the exhaust pipe 62 and the engine 41 can be cooled also by the discharged air from the radiators 101.

The above embodiment illustrates only one aspect of the present invention, and may be modified and applied as desired without departing from the scope of the invention.

The present invention is not limited to the motorcycle 10, but is also applicable to saddle-type vehicles including those other than motorcycles. The saddle-type vehicles refer to vehicles in general where the driver rides astride of the vehicle body, including not only motorcycles but also three-wheeled vehicles and four-wheeled vehicles classified as ATVs (all-terrain vehicles).

The invention claimed is:

1. A cooling structure for a saddle-type vehicle comprising:
    a main frame extending obliquely rearward and downward from a head pipe;
    an engine supported on the main frame;
    an exhaust pipe extending rearward from a front portion of the engine;
    fuel tanks disposed laterally of the engine;
    a skid plate covering the front portion of the engine and the exhaust pipe, the skid plate having openings defined in a central upper portion thereof for introducing ram air from a front of the vehicle toward the engine,
    wherein the openings are covered with a mesh member,
    the skid plate has first bulging portions bulging forward on both sides of the openings,
    the fuel tanks include bulging tank portions disposed rearward of and along the first bulging portions and covering the front portion of the engine, and
    the ram air guided toward a central area in a vehicle widthwise direction by the first bulging portions passes through the mesh member and the openings to cool the exhaust pipe and the engine.

2. The cooling structure for a saddle-type vehicle according to claim 1,
    wherein the skid plate includes on a central lower portion thereof a second bulging portion that bulges forwardly along the exhaust pipe, and
    the second bulging portion is disposed below the mesh member.

3. The cooling structure for a saddle-type vehicle according to claim 2,
    wherein the fuel tanks include cavities defined as dented portions of front walls and inner walls thereof,
    the mesh member overlaps at least portions of the cavities in a vehicle longitudinal direction, and
    the ram air that has passed through the mesh member is collected to the central area in the vehicle widthwise direction by the cavities.

4. The cooling structure for a saddle-type vehicle according to claim 2,
    wherein a front fender that covers an upper portion of a front wheel is disposed forward of the skid plate, and
    the front fender is of a shape substantially along an outer profile of the front wheel, and
    a lower end portion of the front fender is oriented toward the mesh member for guiding the ram air toward the mesh member.

5. The cooling structure for a saddle-type vehicle according to claim 2,
    wherein a down frame that extends substantially downward from the head pipe is disposed below the main frame,
    the down frame comprises a branched area where the down frame is branched into left and right portions in a vicinity of an upper edge of the mesh member, and
    the exhaust pipe extends forward from the engine so as to pass between the left and right portions of the down frame below the branched area.

6. The cooling structure for a saddle-type vehicle according to claim 1,
    wherein the fuel tanks include cavities defined as dented portions of front walls and inner walls thereof,
    the mesh member overlaps at least portions of the cavities in a vehicle longitudinal direction, and
    the ram air that has passed through the mesh member is collected to the central area in the vehicle widthwise direction by the cavities.

7. The cooling structure for a saddle-type vehicle according to claim 6, wherein radiators are disposed in the cavities upwardly of the skid plate, each of the radiators are inclined such that an inner side thereof in the vehicle widthwise direction is positioned rearward of an outer side thereof in the vehicle widthwise direction, and rear surfaces of the cavities are spaced rearward of the radiators and extend along the inclination of the radiators.

8. The cooling structure for a saddle-type vehicle according to claim 6, wherein a front fender that covers an upper portion of a front wheel is disposed forward of the skid plate, and the front fender is of a shape substantially along an outer profile of the front wheel, and a lower end portion of the front fender is oriented toward the mesh member for guiding the ram air toward the mesh member.

9. The cooling structure for a saddle-type vehicle according to claim 6, wherein a down frame that extends substantially downward from the head pipe is disposed below the main frame, the down frame comprises a branched area where the down frame is branched into left and right portions in a vicinity of an upper edge of the mesh member, and the exhaust pipe extends forward from the engine so as to pass between the left and right portions of the down frame below the branched area.

10. The cooling structure for a saddle-type vehicle according to claim 1, wherein a front fender that covers an upper portion of a front wheel is disposed forward of the skid plate, and the front fender is of a shape substantially along an outer profile of the front wheel, and a lower end portion of the front fender is oriented toward the mesh member for guiding the ram air toward the mesh member.

11. The cooling structure for a saddle-type vehicle according to claim 10, wherein a down frame that extends substantially downward from the head pipe is disposed below the main frame, the down frame comprises a branched area where the down frame is branched into left and right portions in a vicinity of an upper edge of the mesh member, and the exhaust pipe extends forward from the engine so as to pass between the left and right portions of the down frame below the branched area.

12. The cooling structure for a saddle-type vehicle according to claim 10, wherein radiators are disposed in the cavities upwardly of the skid plate, each of the radiators are inclined such that an inner side thereof in the vehicle widthwise direction is positioned rearward of an outer side thereof in the vehicle widthwise direction, and rear surfaces of the cavities are spaced rearward of the radiators and extend along the inclination of the radiators.

13. The cooling structure for a saddle-type vehicle according to claim 1, wherein a down frame that extends substantially downward from the head pipe is disposed below the main frame, the down frame comprises a branched area where the down frame is branched into left and right portions in a vicinity of an upper edge of the mesh member, and the exhaust pipe extends forward from the engine so as to pass between the left and right portions of the down frame below the branched area.

14. The cooling structure for a saddle-type vehicle according to claim 13, wherein radiators are disposed in the cavities upwardly of the skid plate, each of the radiators are inclined such that an inner side thereof in the vehicle widthwise direction is positioned rearward of an outer side thereof in the vehicle widthwise direction, and rear surfaces of the cavities are spaced rearward of the radiators and extend along the inclination of the radiators.

* * * * *